United States Patent
Rouet et al.

(10) Patent No.: US 12,499,554 B2
(45) Date of Patent: Dec. 16, 2025

(54) IMAGE PROCESSING

(71) Applicant: KONINKLIJKE PHILIPS N.V., Eindhoven (NL)

(72) Inventors: Germond Rouet, Paris (FR); Haithem Boussaid, Chatenay Malabry (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 280 days.

(21) Appl. No.: 18/279,414

(22) PCT Filed: Feb. 28, 2022

(86) PCT No.: PCT/EP2022/054967
§ 371 (c)(1),
(2) Date: Aug. 30, 2023

(87) PCT Pub. No.: WO2022/184632
PCT Pub. Date: Sep. 9, 2022

(65) Prior Publication Data
US 2024/0185424 A1   Jun. 6, 2024

(30) Foreign Application Priority Data
Mar. 2, 2021   (EP) .................... 21290013

(51) Int. Cl.
*G06K 9/00* (2022.01)
*G06T 7/11* (2017.01)

(52) U.S. Cl.
CPC ...... *G06T 7/11* (2017.01); *G06T 2207/10132* (2013.01); *G06T 2207/20081* (2013.01); *G06T 2207/20084* (2013.01); *G06T 2207/30004* (2013.01)

(58) Field of Classification Search
CPC ............ G06T 7/11; G06T 2207/10132; G06T 2207/20081; G06T 2207/20084; G06T 2207/30004; G06N 3/045; G06N 3/0464; G06N 3/084; G06N 3/09; G06N 20/00
See application file for complete search history.

(56) References Cited

U.S. PATENT DOCUMENTS

| | | | |
|---|---|---|---|
| 10,140,544 B1 * | 11/2018 | Zhao | G06N 20/00 |
| 10,846,875 B2 | 11/2020 | Etcheverry et al. | |
| 2011/0026785 A1 | 2/2011 | Dewaele et al. | |
| 2012/0230568 A1 | 9/2012 | Grbic et al. | |
| 2017/0103532 A1 | 4/2017 | Ghesu et al. | |
| 2019/0205606 A1 * | 7/2019 | Zhou | G06F 18/285 |
| 2021/0038198 A1 * | 2/2021 | Jacob | G06F 18/2135 |

(Continued)

OTHER PUBLICATIONS

International Search Report and Written Opinion for PCT/EP2022/054967; Mailing date: Jul. 4, 2022, 18 pages.

(Continued)

*Primary Examiner* — Xin Jia

(57) ABSTRACT

Proposed are concepts for training a neural network (100), NN, for medical image segmentation. Such concepts include embedding of a shape regularization constraints into learned weights of the NN. Such shape constraints can impose that the output of the segmentation process is anatomically meaningful and further regularized. In this way, improved performance for medical image segmentation may be achieved by proposed embodiments.

15 Claims, 12 Drawing Sheets

(56) References Cited

U.S. PATENT DOCUMENTS

2021/0397966 A1* 12/2021 Sun .................... G06V 10/82

OTHER PUBLICATIONS

Leventon, M.E. et al., "Statistical Shape Influence in Geodesic Active Contours", 5th IEEE EMBS International Summer School on Biomedical Imaging, 2002, 8 pages.
Al Arif, S.M.M.R et al., "SPNet: Shape Prediction Using a Fully Convolutional Neural Network", Medical Image Computing and Computer Assisted Intervention—MICCAI 2018, LNCS 11070, pp. 430-439.
Al Arif, S.M.M.R et al., "Supplementary Material SPNet: Shape Prediction using a Fully Convolution Neural Network", retrieved from https://eecs.qmul.ac.uk/~gslabaugh/publications/ArifVSNetMICCAI2018Supplementary.pdf, 2020, 7 pages.
Nosrati, M.S. et al., "Incorporating prior knowledge in medical image segmentation: a survey", arXiv:1607.01092v1, 2016, 31 pages.
Oktay, O. et al., "Anatomically Constrained Neural Networks (ACNN): Application to Cardiac Image Enhancement and Segmentation", arXiv:1705.08302v4, 2017, 13 pages.
Ronneberger, O. et al., "U-Net: Convolutional Networks for Biomedical Image Segmentation", Medical Image Computing and Computer-Assisted Intervention—MICCAI 2015, vol. 9351, pp. 234-241.
Hill, A. et al., "Active shape models and the shape approximation problem", Image and Vision Computing, 1996, vol. 14, Issue 8, pp. 601-607.

* cited by examiner (a)

(b)

Deformation Weight Vector = [ Signed Distance Map − Mean Shape ] · Deformation Mode Matrix 610   620   630   640

IMAGE PROCESSING

CROSS-REFERENCE TO PRIOR APPLICATIONS

This application is the U.S. National Phase application under 35 U.S.C. § 371 of International Application No. PCT/EP2022/054967, filed on Feb. 28, 2022, which claims the benefit of European Patent Application No. 21290013.8, filed on Mar. 2, 2021. These applications are hereby incorporated by reference herein.

FIELD OF THE INVENTION

The present invention is generally related to image processing and, more particularly, to processing an image with a neural network, NN.

BACKGROUND OF THE INVENTION

The structure of an artificial neural network (or, simply, neural network) is inspired by the human brain. Neural networks (NNs) (or Artificial neural networks (ANNs)) comprise multiple layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

There are several types of NN, such as convolutional neural networks (CNNs) and recurrent neural networks (RNNs). NNs have been used for performing various tasks in medical image processing, such as image de-noising, segmentation, or classification.

Methods of training a NN are well known. Typically, such methods comprise obtaining a training dataset, comprising training input data entries and corresponding training output data entries. An initialized machine-learning algorithm is applied to the input data to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

In the field of medical images, and particularly in relations to biomedical image segmentation, approaches for image processing used Principal Component Analysis (PCA). PCA employs a concept of learning the main deformation mode(s) of a particular anatomy based on analysis of an aligned database of segmentations. More recently, however a neural network architecture known as UNET segmentation algorithm has been used extensively in relation to biomedical image segmentation. Due to its multi-layer architecture, the UNET-based segmentation algorithm produces regularized results. However, direct use of a UNET-based architecture typically remains insufficient to provide anatomically correct or meaningful outputs.

SUMMARY OF THE INVENTION

The invention is defined by the claims.

According to examples in accordance with an aspect of the invention, there is provided a method of determining a loss function for training a neural network, NN, for medical image segmentation. The method comprises: receiving a predicted binary mask from the NN responsive to inputting a training image of an organ, the training image associated with a ground-truth binary mask; and determining a loss function based on the predicted binary mask, wherein the loss function is configured to embed shape regularization constraints into learned weights of the NN, the shape regularization constraints corresponding to the organ. The loss function comprises a principle component analysis, PCA, loss term. The method further comprises: obtaining a plurality of deformation modes of the organ based on PCA of a plurality of training binary masks of the organ; obtaining a plurality of PCA deformation weights of a ground-truth binary mask associated with the predicted binary mask, each of the PCA deformation weights associated with one of the plurality of deformation modes; obtaining a plurality of predicted deformation weights of the predicted binary mask, each of the predicted deformation weights associated with one of the plurality of deformation modes; and determining the PCA loss term based on a comparison between the plurality of predicted deformation weights and the plurality of PCA deformation weights.

There is proposed a concept of embedding of a shape regularization constraint directly within the segmentation NN. Such a shape constraint can impose that the output of the segmentation process is anatomically meaningful and further regularized. In this way, improved performance for medical image segmentation may be achieved by proposed embodiments.

Put another way, embodiments propose to embed shape constraints within the learning of a NN segmentation algorithm. By introducing shape regularization within a NN framework, embodiments may ensure that an output of the segmentation is anatomically correct/relevant.

One particular area for which the proposed concepts may be beneficial is medical image processing. Embodiments may be particularly beneficial for medical image segmentation. For example, embodiments of the invention may be applied to the segmentation of ultrasound images (such as 3D ultrasound images of a kidney for example).

However, embodiments may be used wherever NNs are employed in image processing and the use of shape constraints may provide more accurate or relevant results.

Moreover, the NN may be trained such that it is more anatomically meaningful, and further regularized. Specifically, by using PCA, the shape of the organ and the modes of deformation may be learned. This model of deformations may then be used to provide a context by which the predicted binary mask and ground-truth binary mask may be compared. The PCA loss term may be based on this comparison, and so PCA based shape learning is embedded in the learning weights of the NN.

The proposed concept(s) may also be employed in various types of deep neural networks (DNNs). For instance, with the loss function being integrated with an end-to-end backpropagation algorithm, training approaches/algorithms for different types of deep neural networks may be catered for.

In some embodiments, the loss function may comprise a binary mask loss term. The method may then further comprise determining the binary mask loss term based on a comparison between the predicted binary mask and the associated ground-truth binary mask. In this way, the loss function may take into account differences between the predicted binary mask produced by the NN, and the ground-truth binary mask. The loss function affects the learning weights of the NN, meaning that the NN will learn to compensate for the difference between the binary masks.

Further, the binary mask loss term may be based on inputting the predicted binary mask and the associated ground-truth binary mask into a binary cross-entropy function.

Further, obtaining the plurality of deformation modes may comprise: determining a plurality of aligned training binary masks based on inputting each of the plurality of training binary masks to a spatial transform function, the spatial transform function configured to align a principal axes of a binary mask with an axes of a normalized spatial coordinate system; obtaining a mean shape representation of the organ based on the plurality of aligned training binary masks; calculating a variance matrix based on the mean shape representation; and determining the plurality of deformation modes of the organ based on a singular value decomposition of the variance matrix.

Thus, a number of training binary masks may be aligned and converted in order to learn the shape and deformation modes of the organ by PCA.

Yet further, obtaining the plurality of predicted deformation weights may comprise: determining an aligned binary mask based on inputting the predicted binary mask to the spatial transform function; determining a signed distance map based on the aligned binary mask, the signed distance map configured such that negative values represent the interior of the organ, and the positive values represent the exterior of the organ relative to the mean shape representation; and generating the plurality of predicted deformation weights based on the signed distance map, the mean shape representation of the organ, and the plurality of deformation modes.

In order to determine deformation weights of the binary mask, the mask must first be aligned in the same way as the plurality of training masks were aligned to determine the deformation modes, therefore normalizing the binary mask. A signed distance mask may then be obtained from the binary mask in order to compare it to the deformation modes and the mean shape, in order to determine the deformation weights of the shape represented by the predicted binary mask.

In some embodiments, obtaining the plurality of PCA deformation weights may comprise: determining an aligned ground-truth binary mask based on inputting the ground-truth binary mask to the spatial transform function; determining a ground-truth signed distance map based on the aligned ground-truth binary mask, the ground-truth signed distance map configured such that negative values represent the interior of the organ, and the positive values represent the exterior of the organ relative to the mean shape representation; and generating the plurality of PCA deformation weights based on the ground-truth signed distance map, the mean shape representation of the organ, and the plurality of deformation modes. In this way, the same process may be performed on the ground-truth binary mask, such that the weights of the ground-truth binary mask and predicted binary mask may be meaningfully compared.

The spatial transform function may be a differentiable function.

As the spatial transform function is differentiable, embodiments may employ gradient back-propagation in the NN during training, thus ensuring improved accuracy of the spatial transform function.

In some embodiments, the NN may be a UNET 3D segmentation framework. Thus, the NN may exhibit improved regularization, as UNET 3D segmentation framework provides regularized results due to its multi-layer architecture. For example, according to proposed training concepts, a shape-based regularization may be imposed directly within a UNET 3D segmentation framework. Proposed concepts may thus include the following elements:

UNET 3D segmentation with modified loss function to embed one or more shape regularization constraints;
PCA-based shape learning and derivation of ground-truth weights for the learning datasets;
Differentiable volume alignment, based on axis alignment through ellipsoid fitting (SVD);
Differentiable 3D distance transform for PCA shape projection; and
PCA shape regularization within the loss function of a NN.

According to another aspect of the invention, there is provided a method of segmenting a medical image using a neural network, NN, trained using a loss function determined by a method according to a proposed embodiment.

The method may further comprise: obtaining a medical image of an organ of a subject; and generating a segmented image of the organ of the subject based on a result of inputting the medical image to the NN.

In some embodiments, the method may yet further comprise: communicating the segmented image of the organ to a user; and correcting the segmented image of the organ based on template deformations.

By providing an interactive shape-based correction, the user may have a final decision on the segmentation. This may be particularly beneficial when the NN is segmenting a particularly unusual image, which may otherwise provide sub-optimal results.

Correcting the segmented image of the organ may be further based on an optimization term configured to enforce shape regularization constraints.

According to yet another aspect of the invention, there is provided a computer program product, wherein the computer program product comprises a computer-readable storage medium having computer-readable program code embodied therewith, the computer-readable program code configured to perform all of the steps of a proposed embodiment.

According to another aspect, there is provided processing system for determining a loss function for training a neural network, NN, for medical image segmentation, the system comprising at least one processor configured to: (i) receive a predicted binary mask from the NN responsive to inputting a training image of an organ, the training image associated with a ground-truth binary mask; and (ii) determine a loss function based on the predicted binary mask, wherein the loss function is configured to embed shape regularization constraints into learned weights of the NN, the shape regularization constraints corresponding to the organ, wherein the loss function comprises a principle component analysis, PCA, loss term, and wherein the at least one processor is further configured to: (a) obtain a plurality of deformation modes of the organ based on a PCA of a plurality of training binary masks of the organ; (b) obtain a plurality of PCA deformation weights of a ground-truth binary mask associated with the predicted binary mask, each of the PCA deformation weights associated with one of the plurality of deformation modes; (c) obtain a plurality of predicted deformation weights of the predicted binary mask, each of the predicted deformation weights associated with one of the plurality of deformation modes; and (d) determine the PCA loss term based on a comparison between the plurality of predicted deformation weights and the plurality of PCA deformation weights.

There may also be provided a computer system comprising: a computer program product according to proposed embodiment; and one or more processors adapted to perform a method according to a proposed concept by execution of the computer-readable program code of said computer program product.

The system may be remotely located from a user device. In this way, a user (such as a medical professional) may have an appropriately arranged system that can supply a medical image at a location remotely located from the system for segmenting a medical image. Embodiments may therefore enable a user to process an image using a local system (which may, for example, comprise a portable display device, such as a laptop, tablet computer, mobile phone, PDA, etc.). By way of example, embodiments may provide an application for a mobile computing device, and the application may be executed and/or controlled by a user of the mobile computing device.

The system may further include: a server device for processing (e.g. segmenting) an image with a NN; and a client device comprising a user-interface. Dedicated data processing means may therefore be employed for processing an image with a NN, thus reducing processing requirements or capabilities of other components or devices of the system.

The system may further include a client device, wherein the client device comprises the one or more processors. In other words, a user (such as analyst, doctor or medical professional) may have an appropriately arranged client device (such as a laptop, tablet computer, mobile phone, PDA, etc.) which processes received data in order to process an image with a NN and generate a processing result. Purely by way of example, embodiments may therefore provide a medical image processing system that enables processing of one or more medical images with a NN from a single location, wherein real-time communication between image acquisition apparatus and a user is provided and can have its functionality extended or modified according to proposed concepts, for example.

It will be understood that processing capabilities may therefore be distributed throughout the system in different ways according to predetermined constraints and/or availability of processing resources.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIG. 7 is a representation of a method of generating a deformation weight vector based on a signed distance map, a mean shape representation and a deformation mode matrix;

DETAILED DESCRIPTION OF THE EMBODIMENTS

Figure 1:
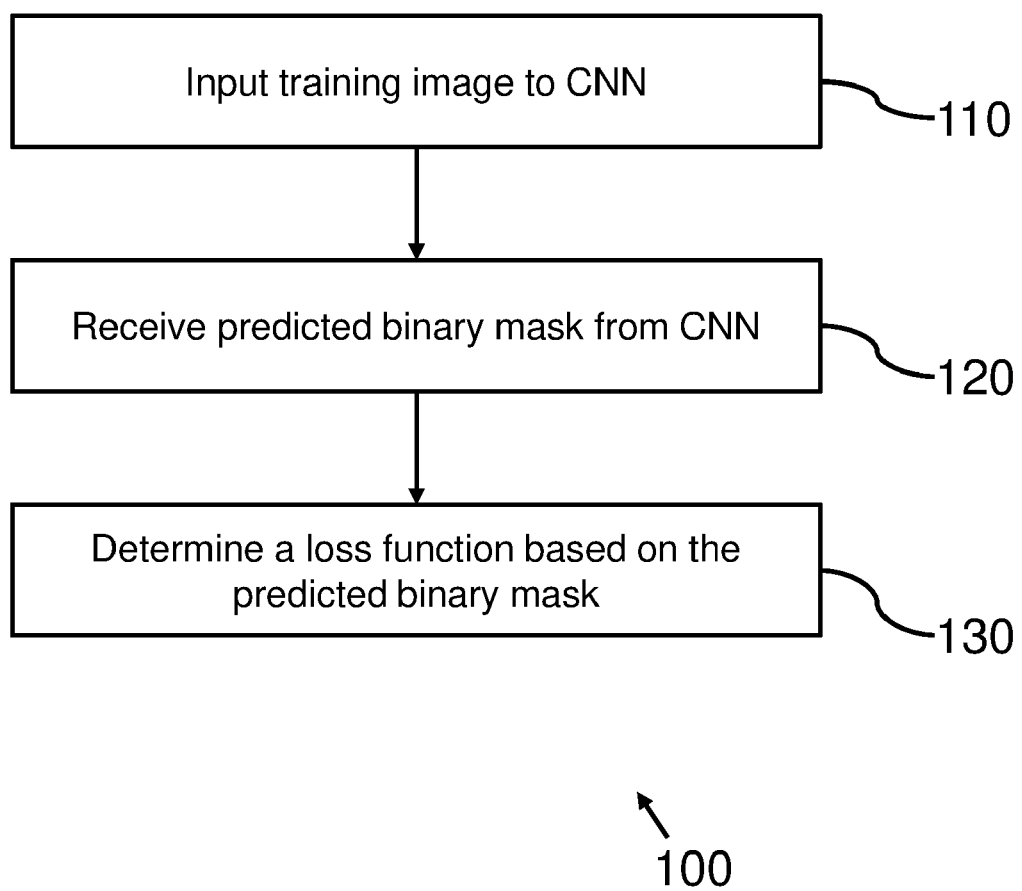
FIG. 1 is a flow diagram of a method of training a CNN according to an exemplary embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. The mere fact that certain measures are recited in mutually different dependent claims does not indicate that a combination of these measures cannot be used to advantage.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

It should be understood that the Figures are merely schematic and are not drawn to scale. It should also be understood that the same reference numerals are used throughout the Figures to indicate the same or similar parts.

The invention proposes the imposition of a shape-based regularization constraints directly within image segmentation frameworks. Such shape constraints may help to ensure that the output of the segmentation process is anatomically meaningful. In this way, improved performance for medical image segmentation may be achieved by proposed embodiments.

In particular, embodiments may propose a concept of embedding a shape regularization constraint in a loss function of a NN based on principle component analysis (PCA). Embodiments may be applicable to a wide range of modalities or anatomical structures. By the use of PCA, the training of the NN may be improved such that segmentations produced by the NN take into account the mean shape of an organ, along with the main modes of deformation of the organ. In other words, the segmentations produced by the NN may be anatomically constrained, and further regularized, such that they more accurately reflect a true segmentation of the organ.

Indeed, put another way, it is proposed that by embedding shape regularization constraints corresponding to an organ of interest in the learned weights, segmentation results may be more anatomically accurate compared to conventional machine learning based segmentation methods. Such improved regularization of segmentation outputs effectively reduces segmentation errors prevalent in present segmentation techniques, particularly machine learning segmentation techniques.

Proposed embodiments may, for example, be used wherever deep NNs are employed in image processing or image segmentation. Although the proposed concept(s) may be applicable to various different NN architectures, Convolutional Neural Network (CNN)-based algorithms have proved to be particularly successful at analyzing images, and are able to segment images with a much lower error rate than other types of neural network. The field of medical image processing using CNNs may thus employ the proposed concept(s). Exemplary embodiments will therefore be described hereinafter with reference to CNNs. However, it is to be understood that embodiments may be applicable to other types of NNs.

FIG. 1 shows an exemplary embodiment of a method 100 of determining a loss function for training a CNN for medical image segmentation.

In step 110, a training image of an organ is input to the CNN. The training image is associated with a ground-truth binary mask. The input training image may be an ultrasound image, a magnetic resonance imaging scan or a computed tomography image, but is not restricted to these examples. The organ may be a kidney, a heart or a brain, but is not restricted to these examples.

In step 120, a predicted binary mask is received from the CNN responsive to step 110. That is, the CNN processes the received training image, and outputs a predicted binary mask based on the received training image.

In step 130, a loss function is determined. Typically, a loss function is a measure of the accuracy of an output of a neural network which can be used to train the CNN. Here, the loss function is determined based on the predicted binary mask, and is configured such that it embeds shape regularization constraints into learned weights of the CNN. The shape constraints correspond to the organ, such that learned weights take into account the shape of the organ being segmented, ultimately improving the accuracy of the CNN.

As a result, the CNN may be trained such that the learned weights are more anatomically meaningful, by directly embedding constraints related to the shape of the organ. As such, the segmented images produced by the CNN may be have an improved accuracy.

Further, this method 100 may be performed a plurality of times in order to train the CNN. As a result, the input to the CNN at the learning phase may be a database of training images, each associated with a ground-truth binary mask.

In some embodiments, the loss function may comprise a plurality of loss terms. Specifically, the loss function may comprise a binary mask/first loss term derived from a comparison between the predicted binary mask and the ground-truth binary mask. Further, the loss function may also comprise a second loss term, being a PCA-related loss term. Alternatively, the loss function may comprise both the first/binary mask loss term and the second/PCA loss term, one of the first/binary mask and second/PCA loss term, or another type of loss term.

According to other embodiments, the CNN may be a UNET 3D segmentation framework. As a result, the CNN may produce regularized results, due to the fact UNET-based segmentation algorithm has a multi-layer architecture. However, it should be noted that the CNN is not restricted to being a UNET segmentation framework, and may be another type of CNN.

Figure 2:
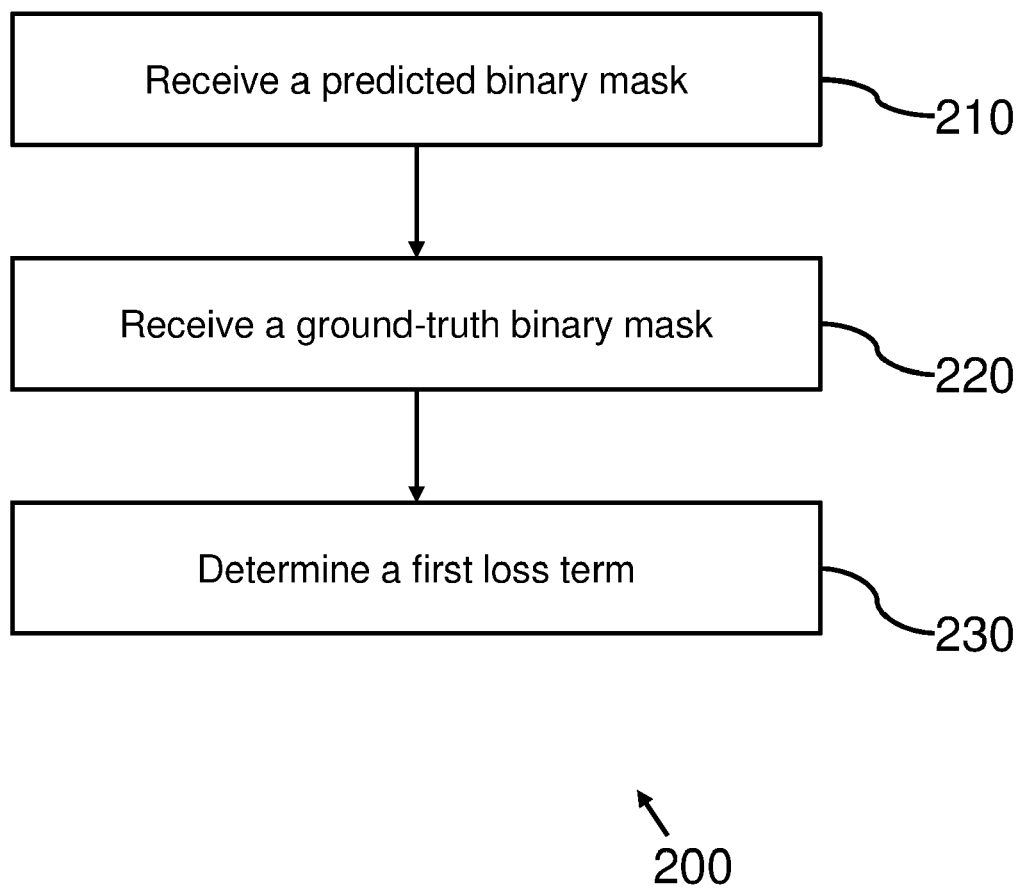
FIG. 2 is a flow diagram of a method of determining a first loss term according to an exemplary embodiment.

FIG. 2 shows a method 200 of determining a first/binary mask loss term of the loss function according to an aspect of an embodiment of the invention.

Specifically, in step 210 a predicted binary mask is received from the CNN, and in step 220 a ground-truth binary mask is received. The predicted binary mask and the ground-truth binary mask are associated, such that they represent the organ of the same image.

In step 230, the first/binary mask loss term may be determined based on a comparison between the predicted binary mask and the ground-truth binary mask. For example, if the difference between the predicted binary mask and the ground-truth binary mask is large, then the first/binary mask loss term may also be large, and if the difference is negligible, the first/binary mask loss term may be zero or close to zero.

In other words, the CNN outputs a predicted binary mask, which is then compared to a binary mask that represents the organ without any errors, in order to derive a first term of the loss function.

Further, the first/binary mask loss term may be based on inputting the predicted binary mask and the associated ground-truth binary mask into a binary cross-entropy function. The binary cross entropy function may be configured to be a measure of similarity between the predicted binary mask and the associated ground-truth binary mask.

The first/binary mask loss term may be considered similar to loss functions of typical segmentation CNNs. However, hyper-parameters of the first/binary mask loss term may be fine tuned to improve segmentation of input images.

Figure 3:
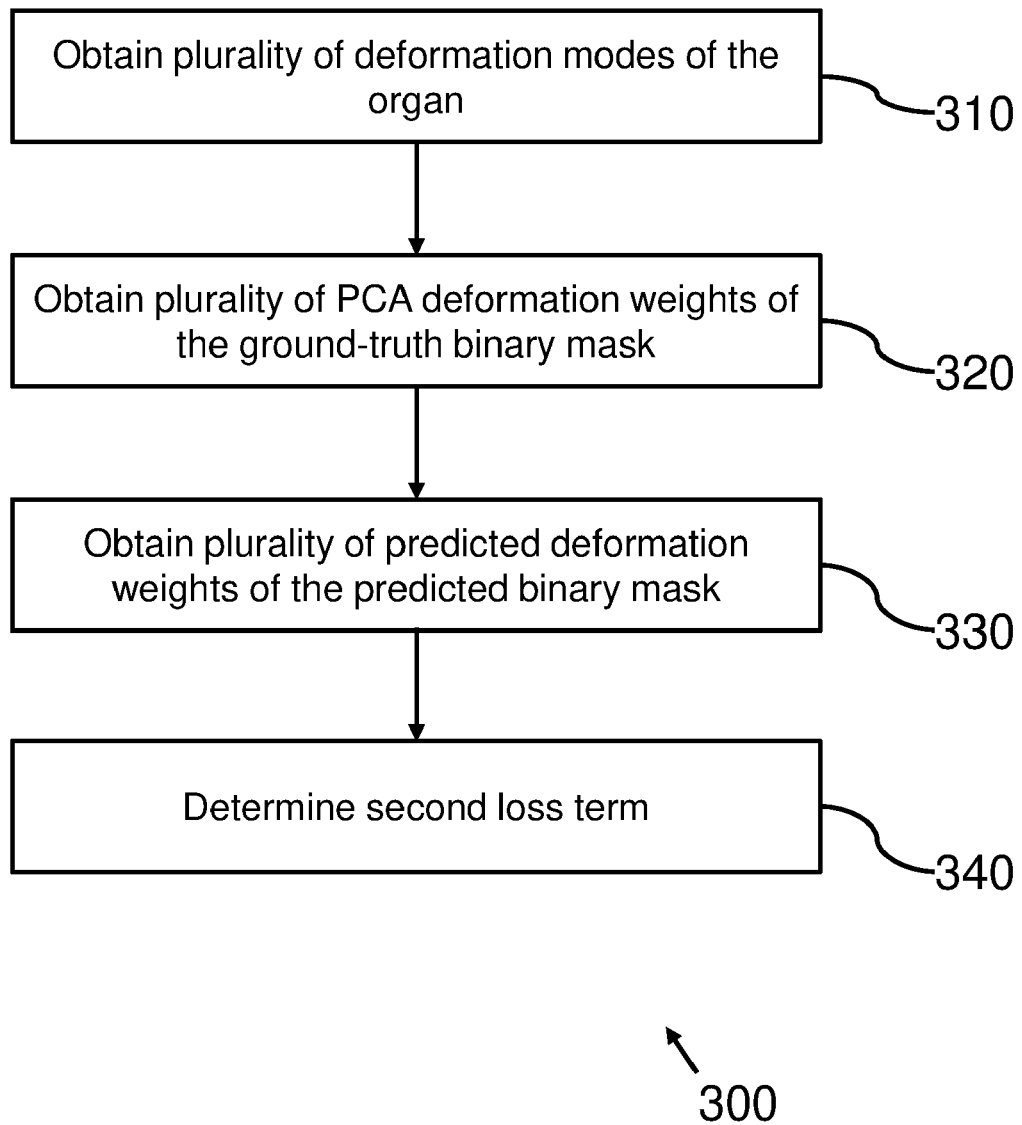
FIG. 3 is a flow diagram of a method of determining a second loss term according to exemplary embodiment.

FIG. 3 shows an exemplary method 300 of determining a second loss term, the second loss term being a PCA-related loss term.

In step 310, a plurality of deformation modes of the organ may be obtained. The deformation modes may be based on a PCA of a plurality of training binary masks of the organ. The plurality of training binary masks may be obtained from a database of training binary masks, or may be generated by another means. A mode of deformation may, for example, be a stretch or squeeze in the direction of the principal axes of the organ. Another mode of deformation may be a twist around the principal axes of the organ.

Figure 4:
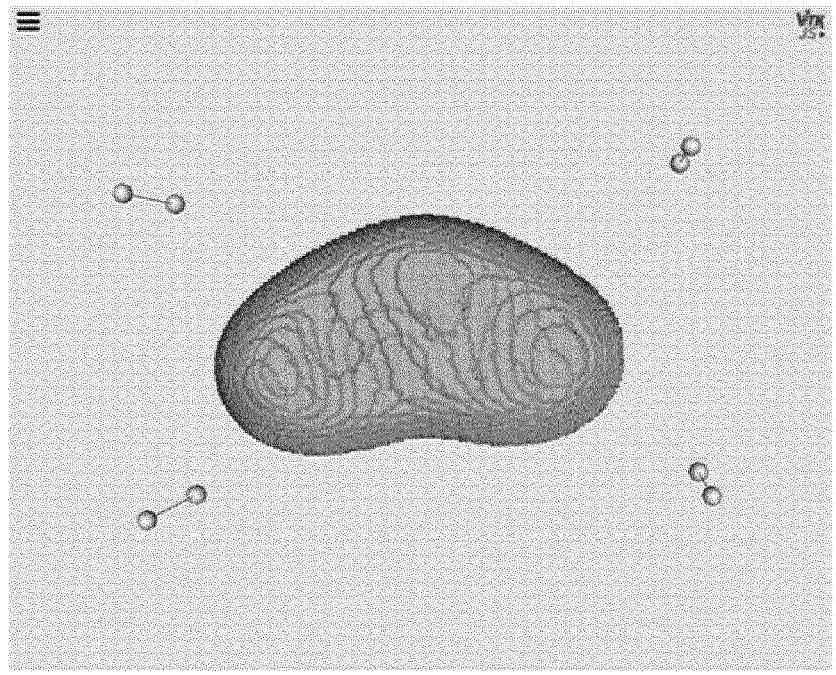
FIG. 4A illustrates a mean shape representation of an organ.
FIG. 4B illustrates the organ of FIG. 4A deformed according to 19 deformation modes.
Figure 4:
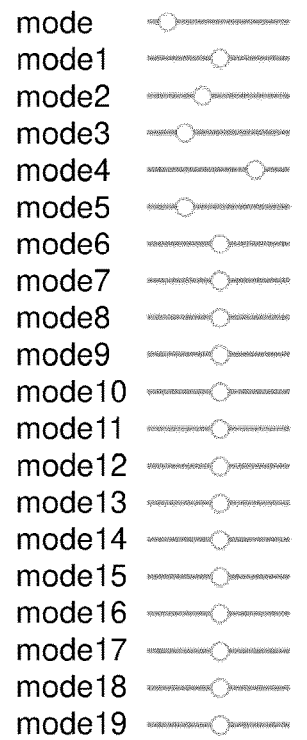
Figure 4:
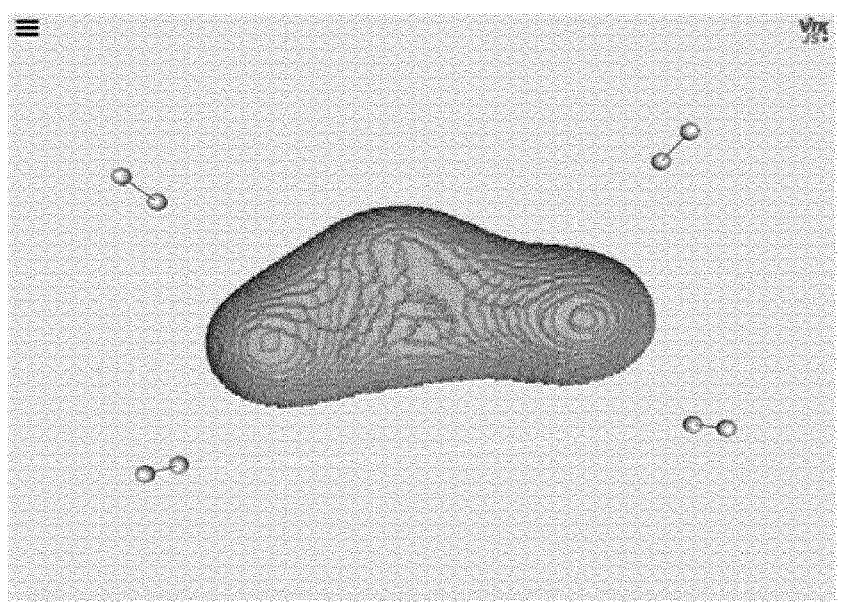
Figure 4:
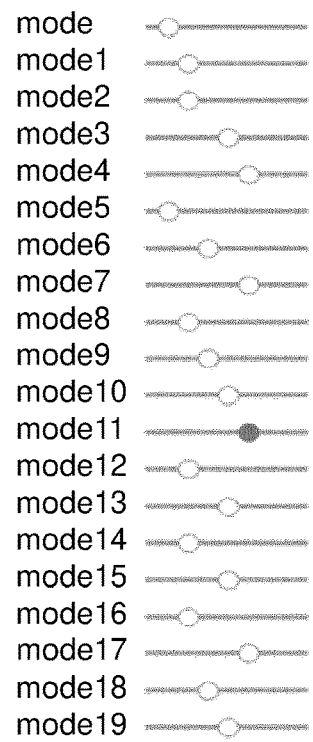

By way of further explanation, the plurality of deformation modes may be capable of defining the full range of shape variability of the organ. For example, FIG. 4A shows the mean shape of a kidney, the kidney represented by 19 deformation modes, indicated by mode1, mode2, mode3, . . . , mode19 respectively. Another number of modes is also possible and foreseen. In such a case, it may be shown that these 19 modes of deformation can represent 99% of the total variance of the shape. FIG. 4B shows a deformation of the kidney, obtained by changing the weights of some of the 19 modes of deformation.

Referring back to FIG. 3, in step 320 a plurality of PCA deformation weights of the ground-truth binary mask are obtained. Each of the plurality of PCA deformation weights corresponds to one of the plurality of deformation modes of the organ. In other words, if each of the PCA deformation weights are applied to the corresponding deformation modes of the organ, then the organ obtained may be the same shape as the ground-truth binary mask.

A deformation weight corresponds to the degree of deformation of the (ground-truth or predicted) binary mask in the deformation mode to which it is associated. For example, if the mode of deformation is a stretch along a principal axis of an organ, then a high deformation weight may indicate that the binary mask is very stretched in the direction of the principal axis. Similarly, if the deformation weight associated with the same deformation mode is low, then the binary mask may represent an organ that is not stretched/only slightly stretched.

Put another way, a deformation weight is a value that is indicative of a degree/magnitude to which a shape of an organ represented by a binary mask differs from a typical shape of such an organ (i.e. how twisted the organ is around an axis, how stretched/squeezed the organ is along an axis). In this way, a deviation of the organ represented by the binary mask from an average representation of such an organ may be summarized.

In step 330, a plurality of predicted deformation weights of the predicted binary mask is obtained. Similarly to step 320, each of the plurality of predicted deformation weights corresponds to one of the plurality of deformation modes of the organ. As such, and again similarly to step 320, if each of the predicted deformation weights are applied to the corresponding deformation modes of the organ, then the organ obtained may be the same shape as the predicted binary mask.

In step 340, the second/PCA loss term is determined based on a comparison between the plurality of predicted deformation weights and the plurality of PCA deformation weights. Accordingly, if the difference between the plurality of predicted deformation weights and the plurality of PCA deformation weights is large, then the second/PCA loss term may be large. If the difference between the plurality of predicted deformation weights and the plurality of PCA deformation weights is small or negligible, the second/PCA loss term may be zero, or near-zero.

Figure 5:
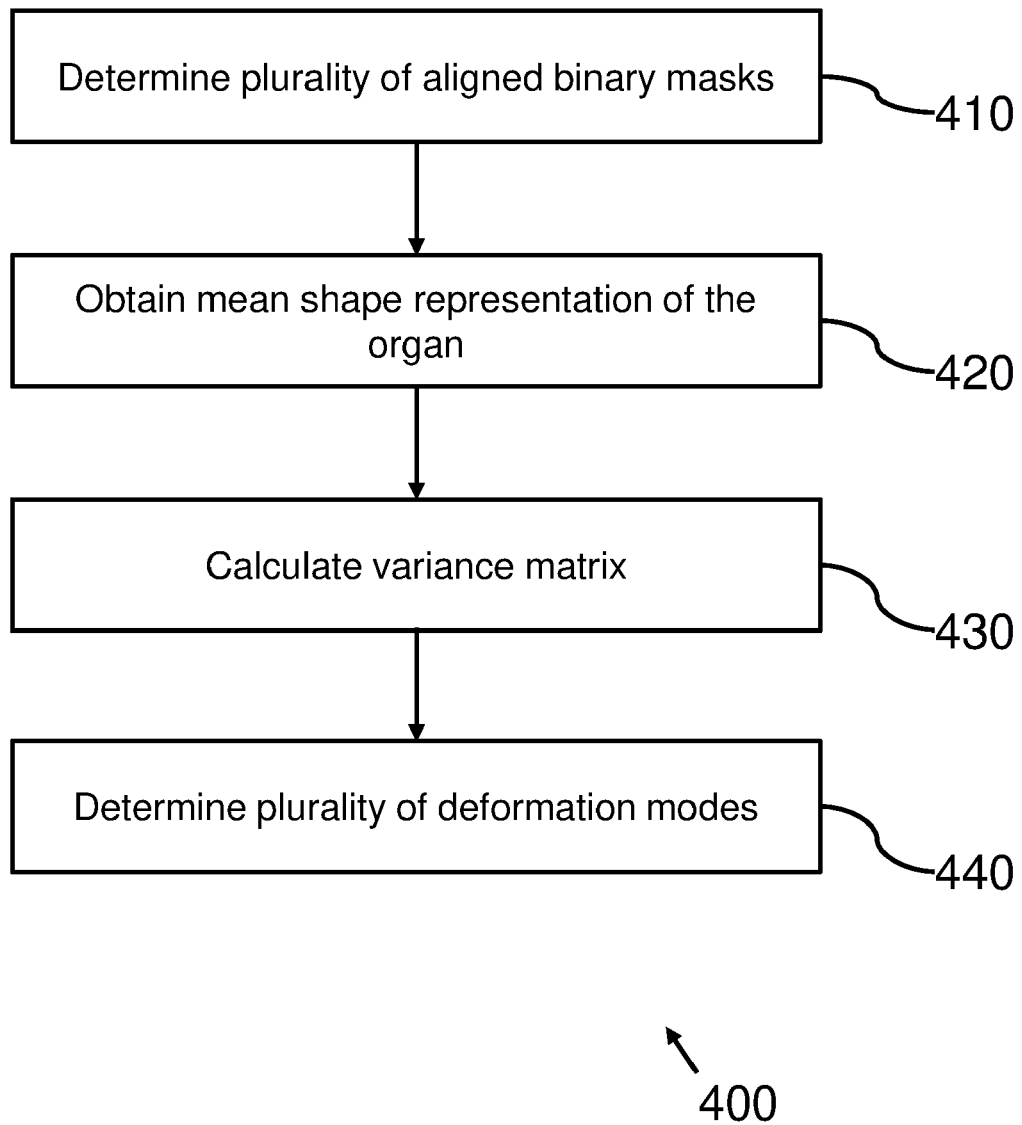
FIG. 5 is a flow diagram of a method of determining a plurality of deformation modes of an organ according to exemplary embodiment.

FIG. 5 shows a method 400 of determining a plurality of deformation modes of an organ.

In step 410, a plurality of aligned binary masks is determined based on inputting each of the plurality of training binary masks to a spatial transform function. Each of the plurality of aligned binary masks may be aligned along principal axes. The spatial transform function may be differentiable, such that there is a possibility of gradient back-propagation in the CNN during training. The spatial transform function will be described in more detail below in reference to FIG. 8.

In other words, a spatial transform function is provided to align each of the binary masks along their principal axis. This may simplify the calculation of deformation modes of the organ (i.e. by removing any rotation of the different binary masks with respect to each other).

In step 420, a mean shape representation of the organ is obtained based on the plurality of aligned binary masks. The mean shape representation may be the average of all of the organs represented by the plurality of aligned binary masks. The mean shape representation may be a signed distance map with the negative values representing the interior of the anatomy while the positive values represent the outside of the shape.

In step 430, a variance matrix may be calculated based on the mean shape representation. As the shapes may follow a Gaussian distribution, the variance of all of the shapes represented by the aligned binary masks may be determined. As a result, a variance matrix may be calculated using known methods.

In step 440, the plurality of deformation modes of the organ is determined based on a singular value decomposition (SVD) of the variance matrix.

To summarize the above, using a plurality of training binary masks representing the organ of interest, a mean shape representation is obtained from the alignment of all the shapes in a common spatial representation. The mean shape representation may be a signed distance map with the negative values representing the interior of the anatomy while the positive values represent the outside of the shape. Assuming that the shapes follow a Gaussian distribution, the variance of the shapes may be computed after subtraction of the mean shape representation. By applying a SVD analysis on the variance matrix, it is possible to obtain the plurality of deformation modes of the organ. These deformation modes correspond to the main eigen-vectors of the SVD decomposition. These may be stored in a feature matrix.

Figure 6:
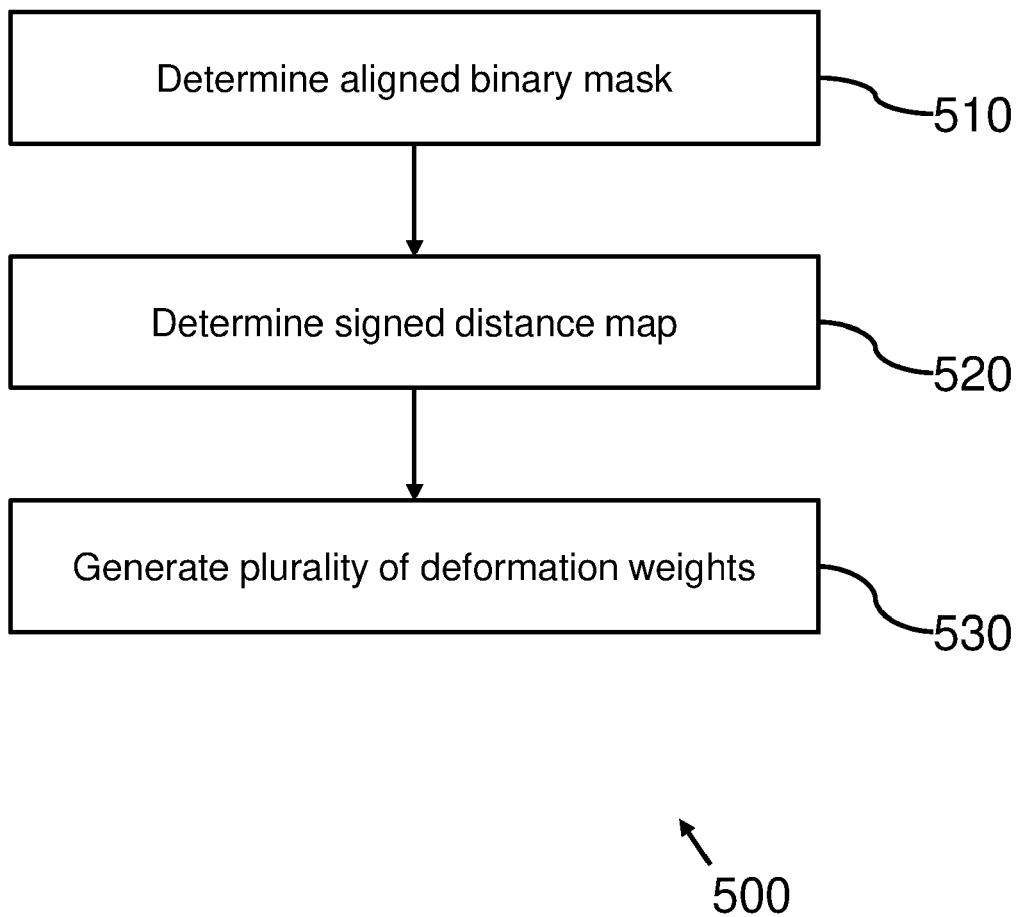
FIG. 6 is a flow diagram of a method of generating a plurality of deformation weights of a binary mask of an organ according to an exemplary embodiment.

FIG. 6 shows a method 500 of generating a plurality of deformation weights of a binary mask of an organ. This method may be used to generate a plurality of PCA deformation weights of the ground-truth binary mask, and to generate the predicted deformation weights of the predicted binary mask.

In step 510, an aligned binary mask is obtained based on inputting the binary mask to a spatial transform function. The spatial transform function may be the same as the spatial transform function used in step 410, and will be described in more detail below in reference to FIG. 8. Alternatively, the spatial transform function may be different to the spatial transform function used in step 410.

By way of explanation, the aligned binary mask may be aligned on its principal axes with the principal axes of the plurality of training binary masks used to generate the plurality of deformation modes. As a result, the aligned binary mask normalized in the same spatial coordinate system as the training binary masks, and so differences due to variation of orientation of the organs represented may be removed.

In step 520, a signed distance map is determined based on the aligned binary mask. The signed distance map is configured such that negative values represent the interior of the organ, and the positive values represent the exterior of the organ. Accordingly, due to the alignment and conversion to the signed distance map, the binary mask may be meaningfully compared to the mean shape representation of the organ.

Put another way, the signed distance map represents the difference between the aligned binary mask, and the mean shape representation of the organ. For example, if the shape of the organ represented by the aligned binary mask is smaller than the mean shape representation (such that when aligned, the binary mask may fit wholly within the mean shape representation), the signed distance map may consist of negative numbers.

In step 530, the plurality of deformation weights is generated based on the signed distance map, the mean shape representation of the organ, and the plurality of deformation modes.

By using the method 500 shown in FIG. 6, each training binary mask that may be used in the training of the CNN can be decomposed in order to obtain the PCA deformation weights in a model domain. These deformation weights correspond to the ground-truth weights of each training volume. These ground truth weights may be further used in the loss computation.

In addition, the method 500 may be used to determine the predicted deformation weights of the predicted binary mask. These may be compared to the PCA deformation weights of the same volume in order to determine the second/PCA loss term.

FIG. 7 presents a simplified representation 600 of the generation of deformation weights of the binary mask according to an aspect of some exemplary embodiments.

To generate the deformation weights, firstly a difference is taken between the signed distance map 620 of the binary mask, and the mean shape representation 630 of the organ. A vector of deformation weights 610 may then be based on a multiplication of the difference and a matrix representing the plurality of deformation modes 640. The vector of deformation weights 610 may comprise the plurality of deformation weights of the binary mask.

Figure 8:
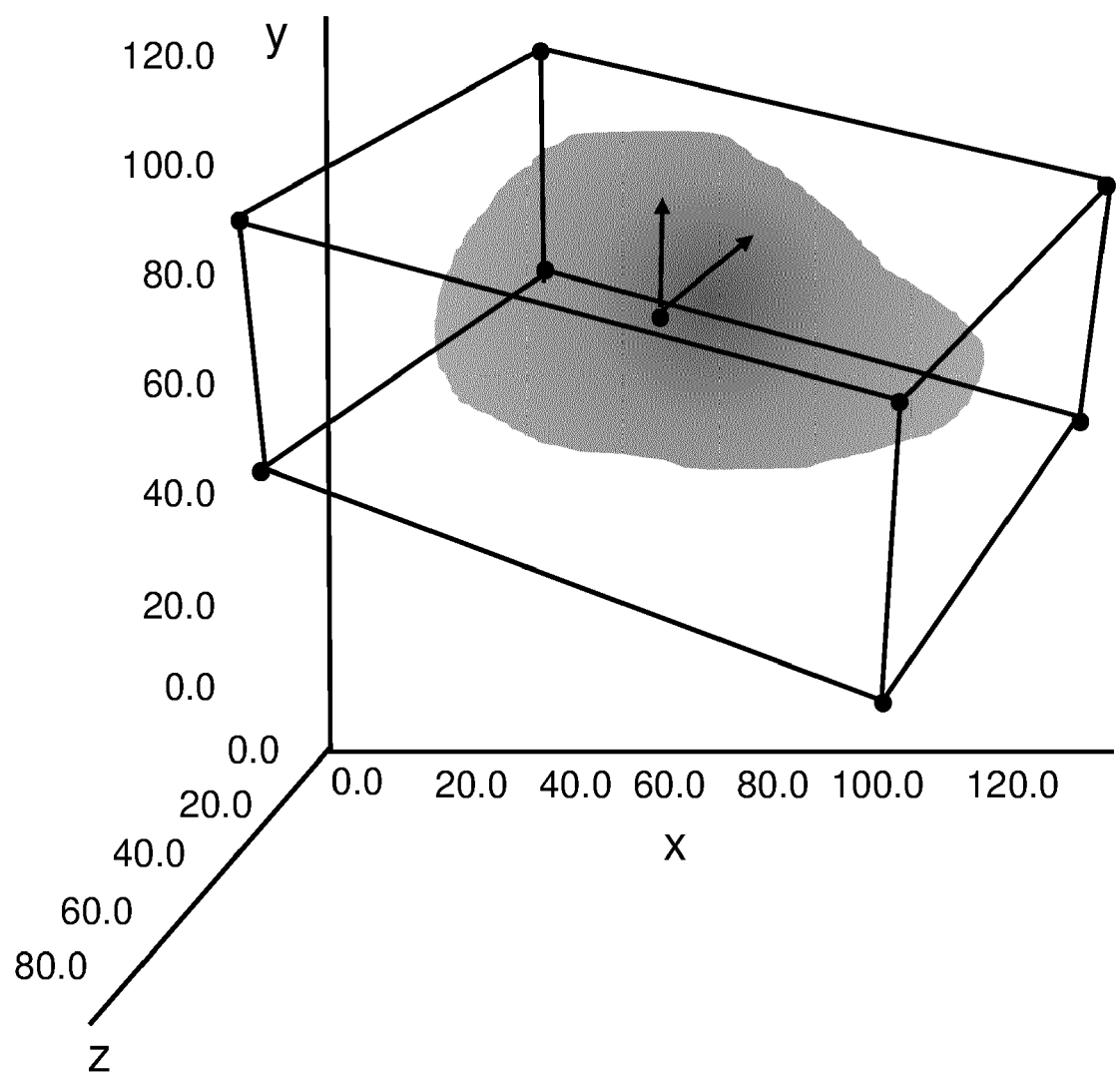
FIG. 8 illustrates an aligned binary map produced based on a spatial transform function.

FIG. 8 depicts an example representation of a binary mask aligned on axes of a normalized spatial coordinate system by a spatial transform function.

As previously described, it is necessary to align the principal axis of the training binary masks, the predicted binary mask, and the ground-truth binary mask on a spatial coordinate system. This is achieved using a spatial transform function, which infers the principal axes of the binary mask, and aligns them with axes of the normalized spatial coordinate system. The spatial coordinate system may be a Cartesian spatial coordinate system represented by three orthogonal axis (X, Y, Z) as indicated in FIG. 8. However, other normalized spatial coordinate systems such as polar, cylindrical, spherical or homogenous coordinate systems may be applied as well.

Since the alignment of the binary mask is a part of the learning process, it is necessary that the spatial transform function must be under the form of a differentiable function. This is necessary in order to ensure the possibility of gradient back-propagation in the CNN at the learning phase.

According to some embodiments, the alignment may also be tuned to address the specifics of the application under consideration. For example, in the case that the image to be segmented is an image of kidney, it may be desirable to use a priori knowledge in order to reduce the search space for the parameters of the spatial transform function.

Figure 9:
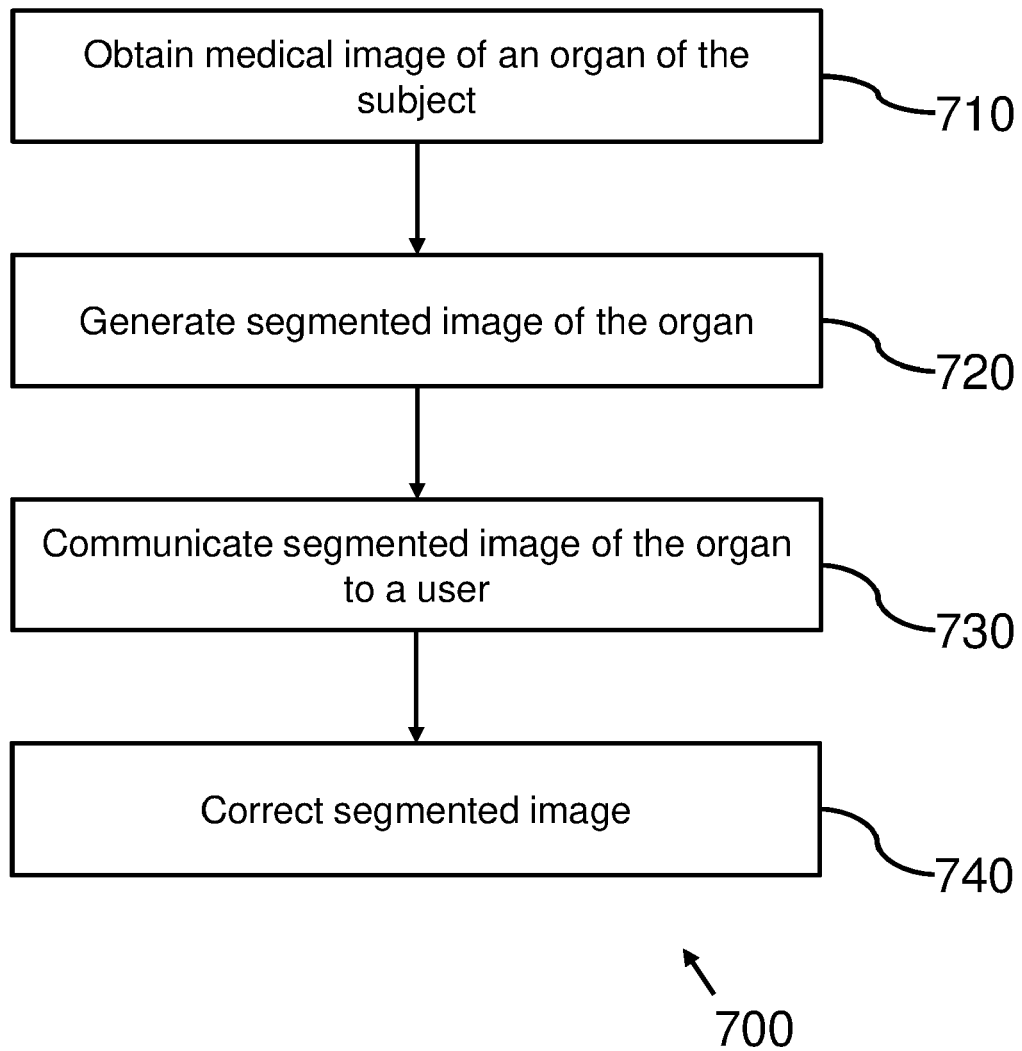
FIG. 9 is a flow diagram of a method of segmenting a medical image using a CNN according to an exemplary embodiment.

FIG. 9 shows a method 700 of segmenting a medical image according to an exemplary embodiment of the invention.

In step 710, a medical image of an organ of a subject is obtained. The medical image may be an ultrasound image, a magnetic resonance imaging scan or a computed tomography image, but is not restricted to these examples. The organ may be a kidney, a heart or a brain, but also is not restricted to these examples.

In step 720, a segmented image of the organ of the subject is generated, by inputting the medical image to a trained CNN. The CNN may be trained according to the method described in relation to FIG. 1, such that the learned weights of the CNN are embedded with shape constraints related to the organ.

In step 730, the segmented image of the organ is communicated to a user. The user may be the subject, a medical professional, or other qualified individual.

In step 740, the segmented image of the organ is corrected based on template deformations of the organ. As a result, inaccuracies which arise from the CNN, but which may be detected by a human may be corrected. This improves the accuracy of segmented images. Further, the correction may be further based on an optimization term configured to enforce shape regularization constraints.

Thus, steps 730 and 740 enable interactive user corrections. In the case that unusual medical images are input the CNN, the CNN may produce sub-optimal results, these steps may be necessary to provide an accurate segmentation. The presence of these steps also enable user to have the final decision on the segmentation. The algorithm used to perform the interactive correction may be based on template deformations, and as such may include an optimization term that enforces shape constraints corresponding to the organ.

Overall, the interactive shape-based correction allows the user to correct if necessary and have a final decision on the segmentation.

Figure 10:
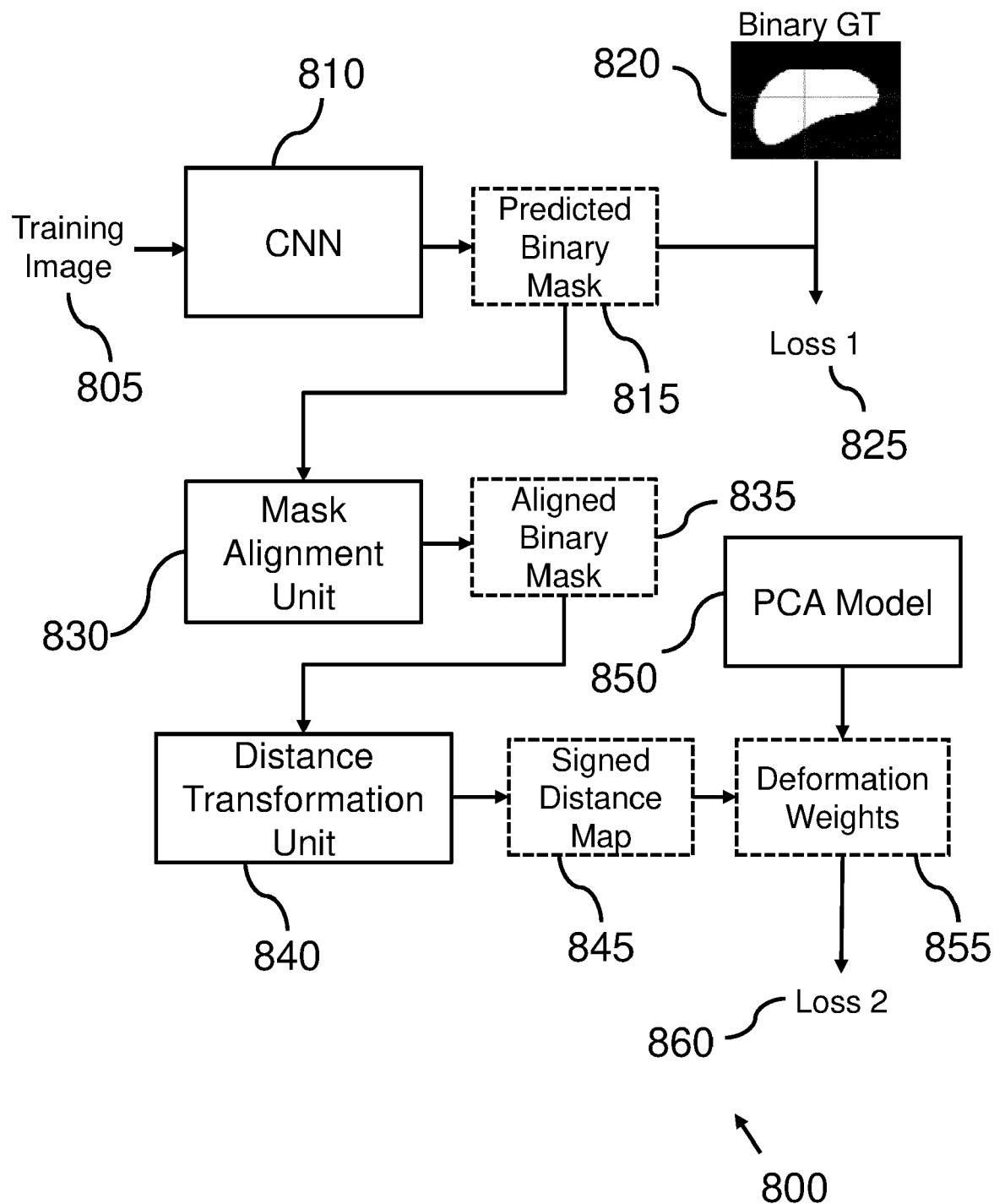
FIG. 10 is a block diagram of an architecture for training a CNN.

FIG. 10 presents a block diagram 800 of the learning phase of the CNN 810 configured to segment an image of an organ, including the generation of a first/binary mask loss term 825 and a second/PCA loss term 860.

Firstly, the CNN 810 outputs a predicted binary mask 815 responsive to receiving a training image 805 of the organ. The predicted binary mask 815 may then be compared to a ground-truth binary mask 820, corresponding to the training image 805 of the organ, in order to determine a first/binary mask loss term 825.

Further, the predicted binary mask 815 may be input to a mask alignment unit 830. The mask alignment unit 830 may be configured to align the principal axes of the predicted binary mask 815 with the axes of a normalized spatial coordinate system. The mask alignment unit 830 may be configured to apply a spatial transform function to the predicted binary mask 815. Specifically, it may be desirable for the spatial transform function to be a differentiable function. Indeed, the spatial transform function may be part of the transformations leading to the generation of the second/PCA loss function 860, and thus may be part of the gradient back-propagation during the CNN 810 learning phase. Thus, responsive to inputting the predicted binary mask 815 to the mask alignment unit 830, the mask alignment unit 830 may output an aligned binary mask 835.

After alignment, the aligned binary mask 835 is transformed into a signed distance map 845. This may be achieved by inputting the aligned binary mask 835 to a distance transformation unit 840, the distance transform unit 840 configured to convert the aligned binary mask 835 into the signed distance map 845 using known methods. In this context, the signed distance map 845 represents the organ of the training image 805 such that negative values represent the interior of the organ, and the positive values represent the exterior of the organ. By then applying a PCA model 850 to the signed distance map 845, a plurality of deformation weights 855 of the predicted binary mask 815 may be obtained. The deformation weights 855 may then be used to generate a second/PCA loss term 860.

In other words, using the signed distance map 845, a model of the PCA 850 may be applied in order to obtain deformation weights 855. The distance between the deformation weights of ground-truth binary mask, and the predicted binary mask is further used to determine a second/PCA loss term 860 in the global loss function of the CNN 810.

Ultimately, a loss function may be determined based on the first/binary mask loss term 825 and the second/PCA loss term 860. Thus, the CNN 810 may be trained with a global loss function of the form: Loss=Loss1+k.Loss2, where k is a hyper parameter, Loss1 is the first/binary mask loss term 825, and Loss2 is the second/PCA loss term 860.

Figure 11:
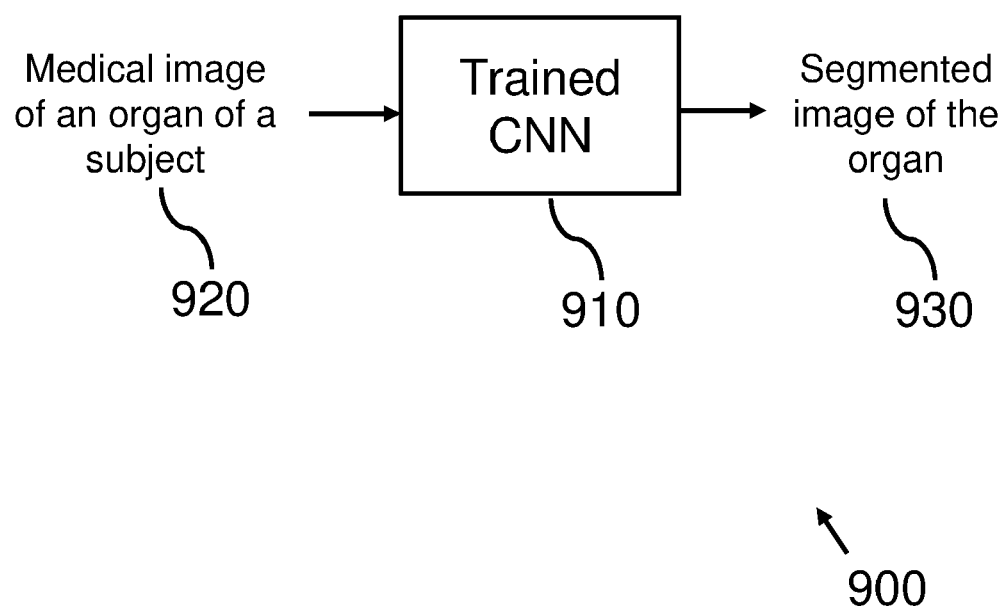
FIG. 11 is a block diagram of the use of the CNN trained to have learned weights with embedded shape constraints.

FIG. 11 presents a block diagram 900 of a use of a CNN 910, trained using the methods described above.

Specifically, the trained CNN 910 is configured to segment medical images of an organ 920. During the training phase, the CNN 910 had shape constraints related to the organ embedded in its learned weights. As such, at inference, the CNN 910 is directly used with the learned weights that embed the shape-constraints. In this way, the CNN 910 is configured to receive a medical image of the organ of a subject 920. Responsive to receiving such an image, the CNN is configured to generate a segmented image of the organ of the subject 930.

By way of example, the trained CNN 910 may be used to segment either 2D or 3D anatomies that require anatomically constrained outputs. More specifically, the trained CNN 910 may be used to segment either 2D or 3D ultrasound images. However, the trained CNN 910 is not restricted to these examples.

Due to training the CNN 910 with a loss function configured to embed shape regularization constraints, which may include a PCA-related loss term, the segmented image of the organ 930 may be more anatomically meaningful. Therefore, the segmented image be a more accurate segmentation of the organ, with fewer errors.

In some embodiments, the CNN 910 is a UNET 3D segmentation framework. Due its multi-level architecture, UNET-based segmentation methods produce regularized results. However, by also applying shape regularization constraints in the learned weights, produced segmentations may be further regularized, and may be more accurate.

Further, in other embodiments there is provided a method of interactive shape-based correction. In such embodiments, the segmented image 930 is communicated to a user, who may then correct the segmented image of the organ 930 based on template deformations corresponding to the organ if necessary. The template deformations may be based on an optimization term configured to enforce shape regularization constraints in the segmentation, aiding the user to determine an accurate segmented image. This ultimately provides the benefit that the user has the final decision on the segmentation.

The exemplary embodiments presented above have been described in conjunction with CNNs, because CNNs have proved to be particularly suited to performing various tasks in medical image processing, such as image de-noising, segmentation, or classification. However, it will be understood that the proposed concept(s) may be applicable to other types of NNs. For instance, training algorithms for different types of deep neural networks may be facilitated because the loss function may be integrated with an end-to-end backpropagation algorithm.

Figure 12:
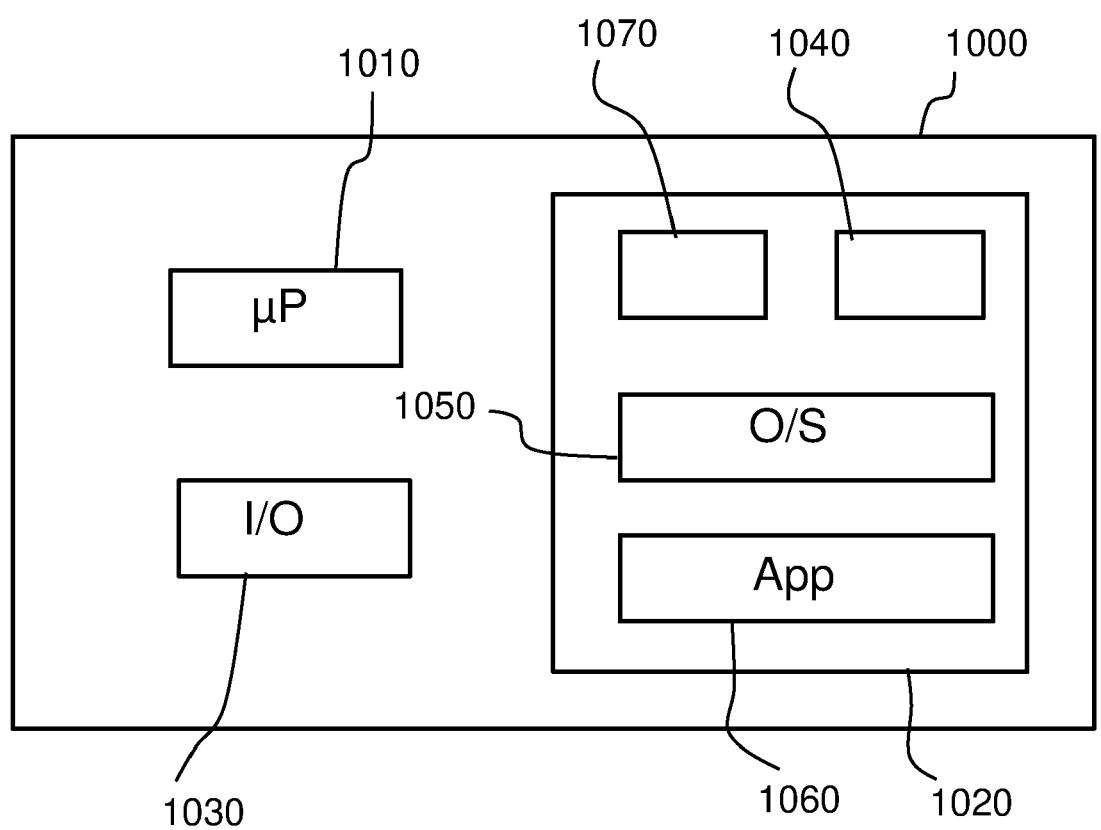
FIG. 12 is a simplified block diagram of a computer within which one or more parts of an embodiment may be employed.

By way of further example, FIG. 12 illustrates an example of a computer 1000 within which one or more parts of an embodiment may be employed. Various operations discussed above may utilize the capabilities of the computer 1000. For example, one or more parts of a system for processing an image with a NN may be incorporated in any element, module, application, and/or component discussed herein. In this regard, it is to be understood that system functional blocks can run on a single computer or may be distributed over several computers and locations (e.g. connected via internet).

The computer 1000 includes, but is not limited to, PCs, workstations, laptops, PDAs, palm devices, servers, storages, and the like. Generally, in terms of hardware architecture, the computer 1000 may include one or more processors 1010, memory 1020, and one or more I/O devices 1070 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1010 is a hardware device for executing software that can be stored in the memory 1020. The processor 1010 can be virtually any custom made or commercially available processor, a central processing unit (CPU), a Graphics Processing Unit (GPU), a digital signal processor (DSP), or an auxiliary processor among several processors associated with the computer 1000, and the processor 1010 may be a semiconductor based microprocessor (in the form of a microchip) or a microprocessor.

The memory 1020 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1020 may incorporate electronic, magnetic, optical, and/or other types of storage media. Note that the memory 1020 can have a distributed architecture, where various components are situated remote from one another, but can be accessed by the processor 1010.

The software in the memory 1020 may include one or more separate programs, each of which comprises an ordered listing of executable instructions for implementing logical functions. The software in the memory 1020 includes a suitable operating system (OS) 1050, compiler 1040, source code 1030, and one or more applications 1060 in accordance with exemplary embodiments. As illustrated, the application 1060 comprises numerous functional components for implementing the features and operations of the exemplary embodiments. The application 1060 of the computer 1000 may represent various applications, computational units, logic, functional units, processes, operations, virtual entities, and/or modules in accordance with exemplary embodiments, but the application 1060 is not meant to be a limitation.

The operating system 1050 controls the execution of other computer programs, and provides scheduling, input-output control, file and data management, memory management, and communication control and related services. It is contemplated by the inventors that the application 1060 for implementing exemplary embodiments may be applicable on all commercially available operating systems.

Application 1060 may be a source program, executable program (object code), script, or any other entity comprising a set of instructions to be performed. When a source program, then the program is usually translated via a compiler (such as the compiler 1040), assembler, interpreter, or the like, which may or may not be included within the memory 1020, so as to operate properly in connection with the OS 1050. Furthermore, the application 1060 can be written as an object oriented programming language, which has classes of data and methods, or a procedural programming language, which has routines, subroutines, and/or functions, for example but not limited to, C, C++, C#, Pascal, BASIC, API calls, HTML, XHTML, XML, ASP scripts, JavaScript, FORTRAN, COBOL, Perl, Java, ADA, NET, and the like.

The I/O devices 1070 may include input devices such as, for example but not limited to, a mouse, keyboard, scanner, microphone, camera, etc. Furthermore, the I/O devices 1070 may also include output devices, for example but not limited to a printer, display, etc. Finally, the F/O devices 1070 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1070 also include components for communicating over various networks, such as the Internet or intranet.

If the computer 1000 is a PC, workstation, intelligent device or the like, the software in the memory 1020 may further include a basic input output system (BIOS) (omitted for simplicity). The BIOS is a set of essential software routines that initialize and test hardware at startup, start the O/S 1050, and support the transfer of data among the hardware devices. The BIOS is stored in some type of read-only-memory, such as ROM, PROM, EPROM, EEPROM or the like, so that the BIOS can be executed when the computer 1000 is activated.

When the computer 1000 is in operation, the processor 1010 is configured to execute software stored within the memory 1020, to communicate data to and from the memory 1020, and to generally control operations of the computer 1000 pursuant to the software. The application 1060 and the O/S 1050 are read, in whole or in part, by the processor 1010, perhaps buffered within the processor 1010, and then executed.

When the application 1060 is implemented in software it should be noted that the application 1060 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 1060 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

A single processor or other unit may fulfill the functions of several items recited in the claims.

It will be understood that the disclosed methods are computer-implemented methods. As such, there is also proposed a concept of a computer program comprising code means for implementing any described method when said program is run on a processing system.

The skilled person would be readily capable of developing a processor for carrying out any herein described method. Thus, each step of a flow chart may represent a different action performed by a processor, and may be performed by a respective module of the processing processor.

As discussed above, the system makes use of a processor to perform the data processing. The processor can be implemented in numerous ways, with software and/or hardware, to perform the various functions required. The processor typically employs one or more microprocessors that may be programmed using software (e.g. microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

The present invention may be a system for training a neural network 100, NN, for medical image segmentation, comprising a processor 1010 and a computer program product that comprises a computer readable storage medium 1020 having computer readable program instructions thereon for causing the processor to carry out:
receiving 120 a predicted binary mask from the NN responsive to inputting a training image of an organ 110, the training image associated with a ground-truth binary mask; and
determining 130 a loss function based on the predicted binary mask, wherein the loss function is configured to embed shape regularization constraints into learned weights of the NN, the shape regularization constraints corresponding to the organ.

Said computer readable program instruction may further cause the processor to carry out any of the disclosed method steps according to the invention. Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted that the term "adapted to" is intended to be equivalent to the term "configured to". Any reference signs in the claims should not be construed as limiting the scope.

The invention claimed is:

1. A method of determining a loss function for training a neural network, NN, for medical image segmentation, the method comprising:
receiving a predicted binary mask from the NN responsive to inputting a training image of an organ, the training image associated with a ground-truth binary mask; and
determining a loss function based on the predicted binary mask, wherein the loss function is configured to embed shape regularization constraints into learned weights of the NN, the shape regularization constraints corresponding to the organ,
wherein the loss function comprises a principle component analysis, PCA, loss term, and wherein the method further comprises:
obtaining a plurality of deformation modes of the organ based on a PCA of a plurality of training binary masks of the organ;
obtaining a plurality of PCA deformation weights of a ground-truth binary mask associated with the predicted binary mask, each of the PCA deformation weights associated with one of the plurality of deformation modes;
obtaining a plurality of predicted deformation weights of the predicted binary mask, each of the predicted deformation weights associated with one of the plurality of deformation modes; and
determining the PCA loss term based on a comparison between the plurality of predicted deformation weights and the plurality of PCA deformation weights.

2. The method of claim 1, wherein the loss function further comprises a binary mask loss term, the method further comprising:
determining the binary mask loss term based on a comparison between the predicted binary mask and the associated ground-truth binary mask.

3. The method of claim 2, wherein the binary mask loss term is based on inputting the predicted binary mask and the associated ground-truth binary mask into a binary cross-entropy function.

4. A computer program comprising computer program code means which is adapted, when said computer program is run on a computer, to implement the method of any claim 1.

5. The method of claim 1, wherein the medical image to be segmented is an ultrasound image.

6. The method of claim 1, wherein the NN is a UNET 3D segmentation framework.

7. The method of any preceding claim, wherein obtaining the plurality of deformation modes comprises:
determining a plurality of aligned training binary masks based on inputting each of the plurality of training binary masks to a spatial transform function, the spatial transform function configured to align a principal axes of a binary mask with an axes of a normalized spatial coordinate system;
obtaining a mean shape representation of the organ based on the plurality of aligned training binary masks;
calculating a variance matrix based on the mean shape representation; and
determining the plurality of deformation modes of the organ based on a singular value decomposition of the variance matrix.

8. The method of claim 7, wherein obtaining the plurality of predicted deformation weights comprises:
determining an aligned binary mask based on inputting the predicted binary mask to the spatial transform function;
determining a signed distance map based on the aligned binary mask, the signed distance map configured such that negative values represent the interior of the organ, and the positive values represent the exterior of the organ relative to the mean shape representation; and
generating the plurality of predicted deformation weights based on the signed distance map, the mean shape representation of the organ, and the plurality of deformation modes.

9. The method of claim 7, wherein obtaining the plurality of PCA deformation weights comprises:
determining an aligned ground-truth binary mask based on inputting the ground-truth binary mask to the spatial transform function;
determining a ground-truth signed distance map based on the aligned ground-truth binary mask, the ground-truth signed distance map configured such that negative values represent the interior of the organ, and the positive values represent the exterior of the organ relative to the mean shape representation; and
generating the plurality of PCA deformation weights based on the ground-truth signed distance map, the mean shape representation of the organ, and the plurality of deformation modes.

10. The method of claim 7, wherein the spatial transform function is a differentiable function.

11. A method of segmenting a medical image comprising:
inputting the medical image to a neural network, NN, trained using a loss function determined according the method of claim 1.

12. The method of claim 11, the method further comprising:
obtaining a medical image of an organ of a subject; and
generating a segmented image of the organ of the subject based on a result of inputting the medical image to the NN.

13. The method of claim 12, further comprising:
communicating the segmented image of the organ to a user; and
correcting the segmented image of the organ based on template deformations.

14. The method of claim 13, wherein correcting the segmented image of the organ is further based on an optimization term configured to enforce shape regularization constraints.

15. A processing system for determining a loss function for training a neural network, NN, for medical image segmentation, the system comprising at least one processor configured to:
- receive a predicted binary mask from the NN responsive to inputting a training image of an organ, the training image associated with a ground-truth binary mask; and
- determine a loss function based on the predicted binary mask, wherein the loss function is configured to embed shape regularization constraints into learned weights of the NN, the shape regularization constraints corresponding to the organ, wherein the loss function comprises a principle component analysis, PCA, loss term, and wherein the at least one processor is further configured to:
- obtain a plurality of deformation modes of the organ based on a PCA of a plurality of training binary masks of the organ;
- obtain a plurality of PCA deformation weights of a ground-truth binary mask associated with the predicted binary mask, each of the PCA deformation weights associated with one of the plurality of deformation modes;
- obtain a plurality of predicted deformation weights of the predicted binary mask, each of the predicted deformation weights associated with one of the plurality of deformation modes; and
- determine the PCA loss term based on a comparison between the plurality of predicted deformation weights and the plurality of PCA deformation weights.

* * * * *